United States Patent
Akkarakaran et al.

(10) Patent No.: US 11,558,846 B2
(45) Date of Patent: Jan. 17, 2023

(54) SYSTEM AND METHODS FOR SUPPORT OF SECURE BASE STATION ALMANAC DATA IN A WIRELESS NETWORK

(71) Applicant: QUALCOMM Incorporated, San Diego, CA (US)

(72) Inventors: Sony Akkarakaran, Poway, CA (US); Sven Fischer, Nuremberg (DE); Stephen William Edge, Escondido, CA (US); Joseph Binamira Soriaga, San Diego, CA (US); Tao Luo, San Diego, CA (US); Peter Gaal, San Diego, CA (US); Alexandros Manolakos, San Diego, CA (US); Guttorm Ringstad Opshaug, Redwood City, CA (US); Zhimin Du, Beijing (CN); Yiqing Cao, Beijing (CN); Tingfang Ji, San Diego, CA (US); Lorenzo Casaccia, Barcelona (ES)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/824,349

(22) Filed: Mar. 19, 2020

(65) Prior Publication Data
US 2020/0314791 A1 Oct. 1, 2020

Related U.S. Application Data

(60) Provisional application No. 62/825,725, filed on Mar. 28, 2019.

(51) Int. Cl.
*H04W 64/00* (2009.01)
*H04W 12/037* (2021.01)

(52) U.S. Cl.
CPC ......... *H04W 64/00* (2013.01); *H04W 12/037* (2021.01)

(58) Field of Classification Search
CPC ..... G06F 16/29; H04W 72/042; H04W 84/12; H04W 12/06; H04W 4/021; H04W 72/0406; H04W 72/0413; H04W 4/027; H04W 4/029; H04W 4/38; H04W 52/386; H04W 56/001; H04W 56/005; H04W 64/003; H04W 92/18
See application file for complete search history.

(56) References Cited

U.S. PATENT DOCUMENTS

| 2017/0374638 | A1* | 12/2017 | Han | ............... G01S 5/10 |
| 2018/0124787 | A1* | 5/2018 | Wang | .............. H04L 27/2613 |
| 2018/0213350 | A1 | 7/2018 | Pon et al. | |

OTHER PUBLICATIONS

International Search Report and Written Opinion—PCT/US2020/023982—ISA/EPO—dated Jul. 2, 2020.

* cited by examiner

*Primary Examiner* — Kwasi Karikari
(74) *Attorney, Agent, or Firm* — Thien T. Nguyen

(57) ABSTRACT

A reference signal periodically transmitted by a base station in a wireless network can have certain proprietary properties to help prevent detection and utilization of the signal for unauthorized positioning of mobile devices. More specifically, a network node can obscure and introduce time-variation in mapping between positioning signals and a corresponding physical base stations. The network node may also introduce time variations in fields of a base station almanac (BSA) provided to subscribing user equipments (UEs). The information transmitted to the subscribing UEs may be encrypted.

52 Claims, 9 Drawing Sheets

SYSTEM AND METHODS FOR SUPPORT OF SECURE BASE STATION ALMANAC DATA IN A WIRELESS NETWORK

CROSS-REFERENCE TO RELATED APPLICATIONS

The present Application for Patent claims the benefit of U.S. Provisional Application No. 62/825,725, entitled "SECURE BASE STATION ALMANAC," filed Mar. 28, 2019, assigned to the assignee hereof, and expressly incorporated herein by reference in its entirety.

1. Technical Field

Various aspects described herein generally relate to wireless communication systems, and more particularly, to secured transmission of base station location information to a UE to assist with positioning of the UE.

2. Background

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) mobile standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Obtaining the location or position of a mobile device that is accessing a wireless network may be useful for many applications including, for example, emergency calls, personal navigation, asset tracking, locating a friend or family member, etc. Existing positioning methods include methods based on a mobile device measuring radio signals transmitted from a variety of devices, including satellite vehicles (SVs) and terrestrial radio sources in a wireless network. It is expected that standardization for 5G wireless networks will include support for various positioning methods, which may utilize reference signals transmitted by base stations in a manner similar to LTE wireless networks' utilization of positioning reference signals (PRS) and/or cell-specific reference signals (CRS) for position determination. Problematically, the transmission of these signals may make proprietary base station information (e.g., base station identity and location) more easily determinable.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An exemplary method performed by a user equipment (UE) is disclosed. The method may comprise receiving a base station almanac (BSA) from a network node of a wireless communication network. The BSA may comprise information for a plurality of base stations in the wireless communication network (not necessarily all base stations) including a location of each base station of the plurality of base stations. For example, the UE may receive only the information regarding base-stations that are relevant to determine its position, e.g., base-stations of which it is aware of PRS configuration, or is monitoring PRS. The method may also comprise receiving a change notification from the network node, and applying changes to the positioning signal parameters of the positioning signals in accordance with the change notification. The change notification may comprise information on changes to positioning signal parameters of positioning signals transmitted from one or more base stations of the plurality of base stations. The method may further comprise receiving a plurality of positioning signals from the plurality of base stations, and determining a UE position based on the plurality of positioning signals, the positioning signal parameters of the plurality of positioning signals, the BSA, and the change notification.

An exemplary method performed by a network node of a wireless communication network is disclosed. The method may comprise transmitting a BSA to a UE. The BSA may comprise information for a plurality of base stations in the wireless communication network including a location of each base station of the plurality of base stations. The method may also comprise changing one or more positioning signal parameters of positioning signals transmitted from one or more base stations of the plurality of base stations. The method may further comprise transmitting a change notification to the UE. The change notification may comprise information on changes to the positioning signal parameters.

An exemplary UE is disclosed. The UE may comprise a memory, at least one transceiver, and at least one processor communicatively coupled to the memory and the at least one transceiver. The at least one processor may be configured to receive a BSA from a network node of a wireless communication network. The BSA may comprise information for a plurality of base stations in the wireless communication network including a location of each base station of the plurality of base stations. The transceiver, memory, and processor may also be configured to receive a change notification from the network node, and apply changes to the positioning signal parameters of the positioning signals in accordance with the change notification. The change notification may comprise information on changes to positioning signal parameters of positioning signals transmitted from one or more base stations of the plurality of base stations. The transceiver, memory, and processor may further be configured to receive a plurality of positioning signals from the plurality of base stations, and determine a UE position based on the plurality of positioning signals, the positioning signal parameters of the plurality of positioning signals, the BSA, and the change notification.

An exemplary network node of a wireless communication network is disclosed. The network node may comprise a memory, a communication device, and at least one processor communicatively coupled to the memory and the communication device. The at least one processor may be configured to cause the communication device to transmit a BSA to a UE. The BSA may comprise information for a plurality of base stations in the wireless communication network including a location of each base station of the plurality of base stations. The at least one processor may also be configured to change one or more positioning signal parameters of positioning signals transmitted from one or more base stations of the plurality of base stations. The at least one processor may further be configured to transmit a change notification to the UE. The change notification may comprise information on changes to the positioning signal parameters.

Another exemplary UE is disclosed. The UE may comprise means for receiving a BSA from a network node of a wireless communication network. The BSA may comprise information for a plurality of base stations in the wireless communication network including a location of each base station of the plurality of base stations. The UE may also comprise means for receiving a change notification from the network node, and means for applying changes to the positioning signal parameters of the positioning signals in accordance with the change notification. The change notification may comprise information on changes to positioning signal parameters of positioning signals transmitted from one or more base stations of the plurality of base stations. The UE may further comprise means for receiving a plurality of positioning signals from the plurality of base stations, and means for determining a UE position based on the plurality of positioning signals, the positioning signal parameters of the plurality of positioning signals, the BSA, and the change notification.

Another exemplary network node of a wireless communication network is disclosed. The network node may comprise means for transmitting a BSA to a UE. The BSA may comprise information for a plurality of base stations in the wireless communication network including a location of each base station of the plurality of base stations. The network node may also comprise means for changing one or more positioning signal parameters of positioning signals transmitted from one or more base stations of the plurality of base stations. The network node may further comprise means for transmitting a change notification to the UE. The change notification may comprise information on changes to the positioning signal parameters.

An exemplary non-transitory computer-readable medium may store computer-executable instructions for directing a UE. The computer-executable instructions may include at least one instruction instructing a UE to receive a BSA from a network node of a wireless communication network, the BSA including information for a plurality of base stations in the wireless communication network including a location of each base station of the plurality of base stations. The computer-executable instructions may further include at least one instruction instructing the UE to receive a change notification from the network node, the change notification including information on changes to positioning signal parameters of positioning signals transmitted from one or more base stations of the plurality of base stations. The computer-executable instructions may further include at least one instruction instructing the UE to apply changes to the positioning signal parameters of the positioning signals in accordance with the change notification. The computer-executable instructions may further include at least one instruction instructing the UE to receive a plurality of positioning signals from the plurality of base stations. The computer-executable instructions may further include at least one instruction instructing the UE to determine a UE position based on the plurality of positioning signals, the positioning signal parameters of the plurality of positioning signals, the BSA, and the change notification.

Another exemplary non-transitory computer-readable medium may store computer-executable instructions for directing a network node. The computer-executable instructions may include at least one instruction instructing a network node to transmit a BSA to a UE, the BSA including information for a plurality of base stations in the wireless communication network including a location of each base station of the plurality of base stations. The computer-executable instructions may further include at least one instruction instructing the network node to change one or more positioning signal parameters of positioning signals transmitted from one or more base stations of the plurality of base stations. The computer-executable instructions may further include at least one instruction instructing the network node to transmit a change notification to the UE, the change notification including information on changes to the positioning signal parameters.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
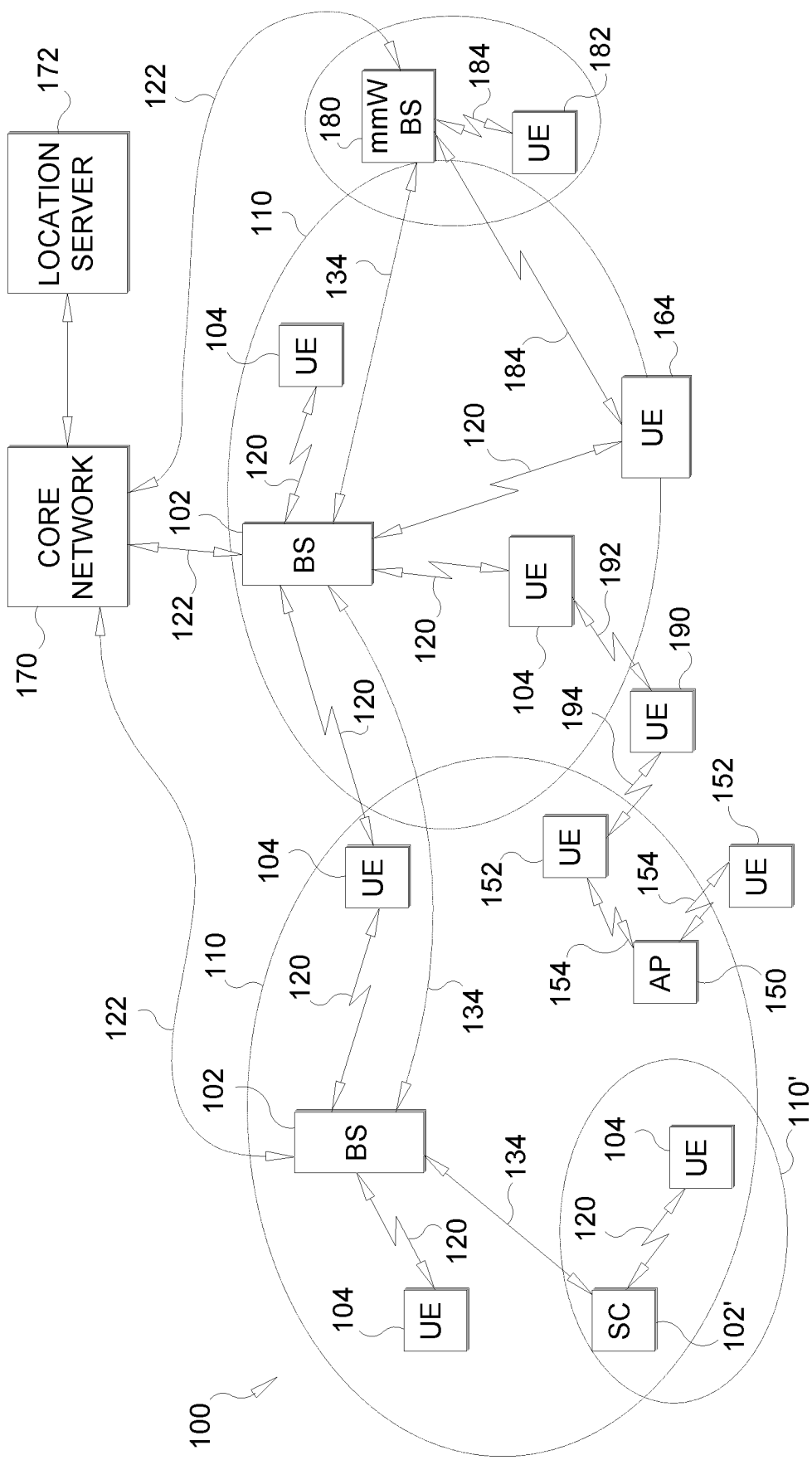
FIG. 1 illustrates an exemplary wireless communications system in accordance with one or more aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity).

In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
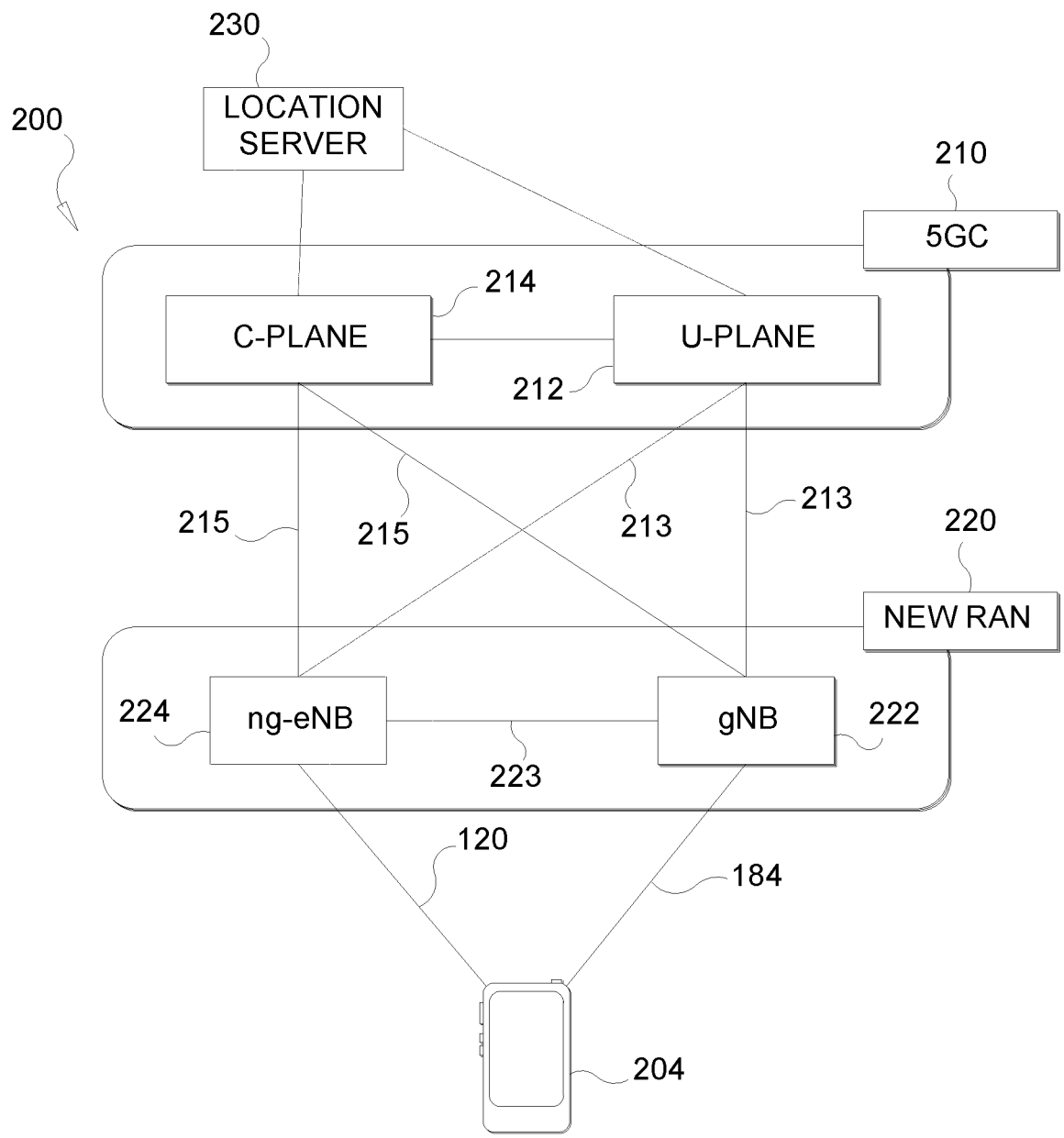
FIGS. 2A and 2B illustrate example wireless network structures in accordance with one or more aspects of the disclosure.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
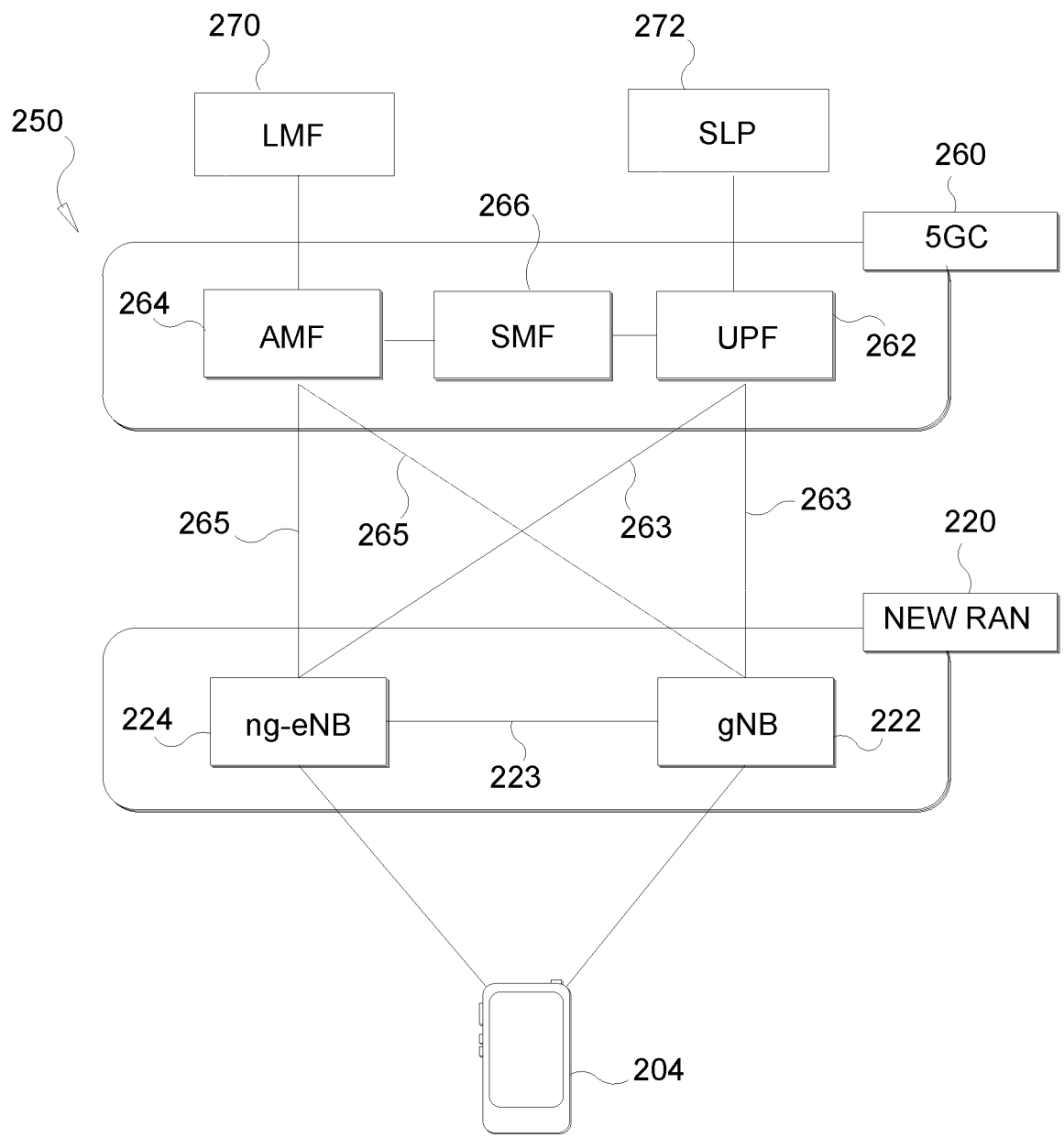

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 164 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 270 may communicate with UEs 204 and external clients (not shown in FIG. 2B) over a user plane (e.g., using protocols intended to carry voice and/or data like the transmission control protocol (TCP) and/or IP).

Figure 3A:
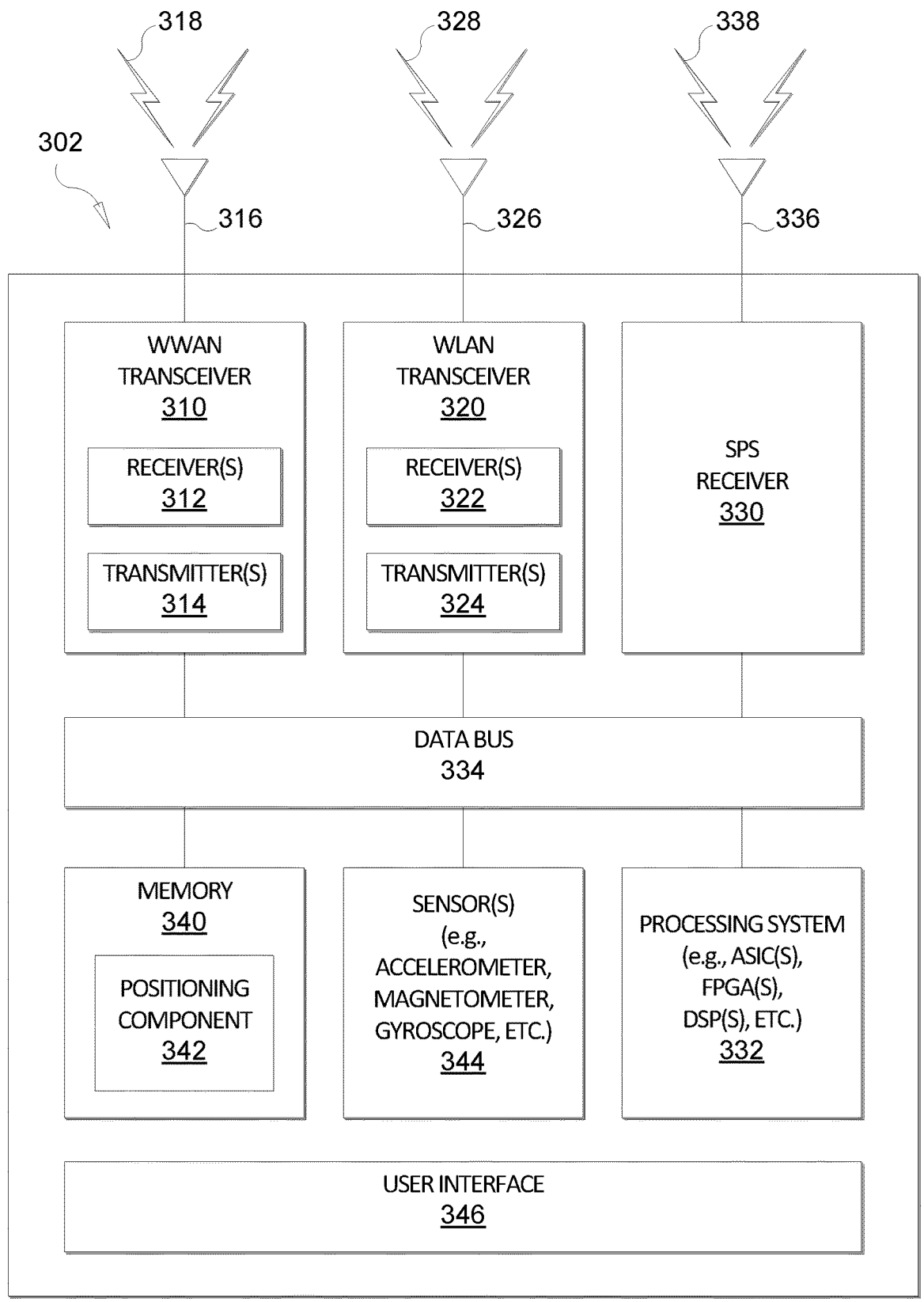
FIGS. 3A to 3C are simplified block diagrams of several sample aspects of components that may be employed in a UE, a base station, and a network entity, respectively, and configured to support communication as taught herein.
Figure 3B:
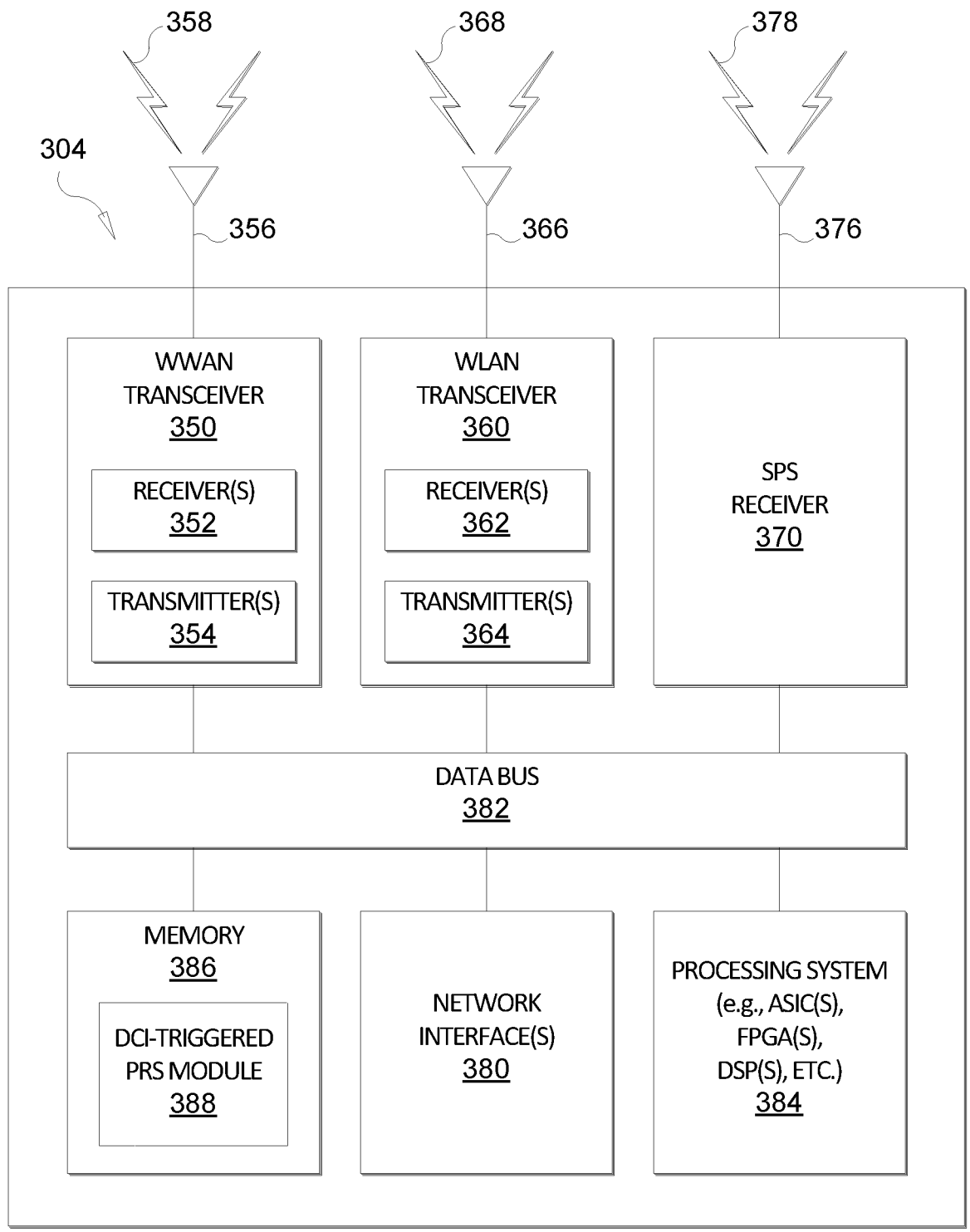
Figure 3C:
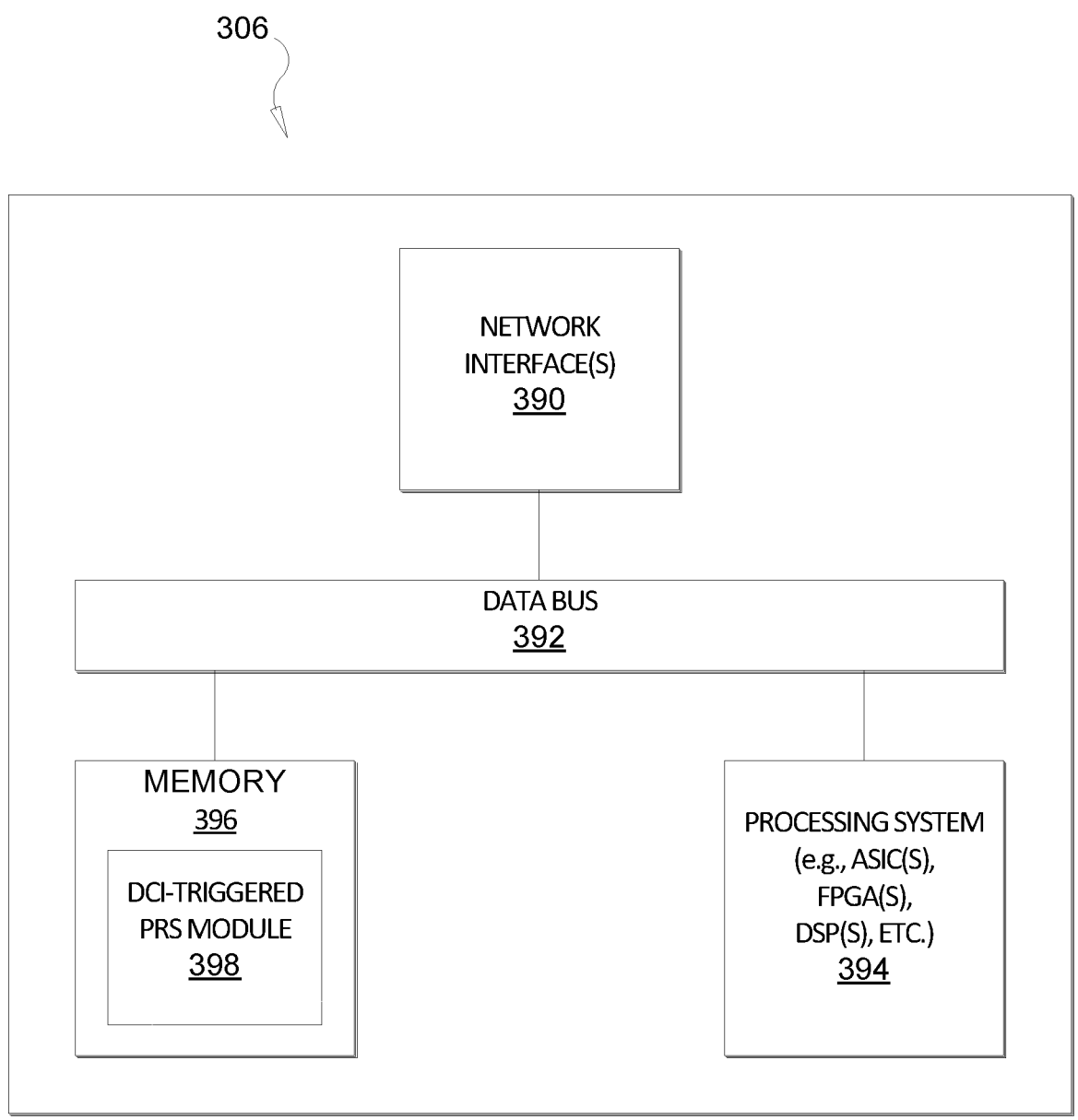

FIGS. 3A, 3B, and 3C illustrate several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230, the LMF 270, and the SLP 272) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., ng-eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including a transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 336, and 376), such as an antenna array, that permits the respective apparatus to perform transmit "beamforming," as described herein. Similarly, a receiver may include or be coupled to a plurality of antennas (e.g., antennas 316, 336, and 376), such as an antenna array, that permits the respective apparatus to perform receive beamforming, as described herein. In an aspect, the transmitter and receiver may share the same plurality of antennas (e.g., antennas 316, 336, and 376), such that the respective apparatus can only receive or transmit at a given time, not both at the same time. A wireless communication device (e.g., one or both of the transceivers 310 and 320 and/or 350 and 360) of the apparatuses 302 and/or 304 may also comprise a network listen module (NLM) or the like for performing various measurements.

The apparatuses 302 and 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine the apparatus' 302 and 304 positions using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving: messages, parameters, or other types of information.

The apparatuses 302, 304, and 306 also include other components that may be used in conjunction with the operations as disclosed herein. The UE 302 includes processor circuitry implementing a processing system 332 for providing functionality relating to, for example, reception of base station almanac (BSA) information as disclosed herein and for providing other processing functionality. The base station 304 includes a processing system 384 for providing functionality relating to, for example, transmission of BSA information as disclosed herein and for providing other processing functionality. The network entity 306 includes a processing system 394 for providing functionality relating to, for example, transmission of BSA information as disclosed herein and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The apparatuses 302, 304, and 306 include memory circuitry implementing memory components 340, 386, and 396 (e.g., each including a memory device), respectively, for maintaining information (e.g., information indicative of reserved resources, thresholds, parameters, and so on). In some cases, the apparatuses 302, 304, and 306 may include positioning components 342, 388, and 398, respectively. The positioning components 342, 388, and 398 may be hardware circuits that are part of or coupled to the processing systems 332, 384, and 394, respectively, that, when executed, cause the apparatuses 302, 304, and 306 to perform the functionality described herein. In other aspects, the positioning components 342, 388, and 398 may be external to the processing systems 332, 384, and 394 (e.g., part of a modem processing system, integrated with another processing system, etc.). Alternatively, the positioning components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the apparatuses 302, 304, and 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The UL transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the apparatuses 302, 304, and/or 306 are shown in FIGS. 3A-C as including various components that may be configured according to the various examples described herein. It will be appreciated, however, that the illustrated blocks may have different functionality in different designs.

The various components of the apparatuses 302, 304, and 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the positioning components 342, 388, and 398, etc.

A position estimate (e.g., for a UE 104) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

For terrestrial positioning of a UE in cellular networks, techniques such as advanced forward link trilateration (AFLT) and observed time difference of arrival (OTDOA) often operate in "UE-assisted" mode in which measurements of reference signals (e.g., PRS, CRS, etc.) transmitted by base stations are taken by the UE and then provided to a location server (e.g., LMF 270 or SLP 272). The location server then calculates the position of the UE based on the measurements and known locations of the base stations. Because these techniques require the location server to calculate the position of the UE, rather than the UE itself, these positioning techniques are not frequently used in applications such as vehicle or cell phone navigation, which instead typically rely on satellite-based positioning.

A UE can use global navigation satellite system (GNSS) positioning techniques for high accuracy positioning using precise point positioning (PPP) or real time kinematic (RTK) technologies. These positioning techniques use assistance data, such as measurements, from ground-based stations. In LTE, this data may be encrypted so that only the UEs subscribed to the service can read the information. Such assistance data varies with time. Thus, a UE subscribed to the service cannot easily "break encryption" for other UEs by passing on the data to other UEs that have not paid for the subscription. The passing on would need to be repeated every time the assistance data changes.

In UE-assisted positioning, the UE sends measurements (e.g., OTDOA, angle of arrival (AoA), round-trip time (RTT) etc.) to the location server (e.g., location server 230, LMF 270, SLP 272). The location server stores a BSA containing multiple 'entries' or 'records,' one record per cell/TRP, where each record contains the geographical location of the base station supporting the cell/TRP, but may also include other data. An identifier of the 'record' among the multiple 'records' in the BSA may be referenced. The information from the BSA and the measurements from the UE can be used to compute the position of the UE. Note that BSA information may also be referred to as assistance data or assistance information.

In conventional UE-based positioning, a UE obtains location measurements and then computes its own position using the location measurements, thus avoiding the need to send the location measurements to the network (e.g., location server), which in turn improves latency and scalability. However, when terrestrial position methods are used (e.g., OTDOA) in which location measurements are obtained by the UE for downlink signals transmitted by base stations, the UE needs the relevant BSA record information (e.g., locations of the base stations) from the network. The BSA information may be sent (e.g., via broadcast or unicast) from the network (e.g., from a gNB or location server) to the UE in an encrypted form. However, since some parts of the BSA information (e.g., the locations of the base stations) vary much less often, for example, compared to the PPP or RTK assistance data described earlier, it is easier to be made available to UEs that did not subscribe and pay for the decryption keys. Also, the transmission of reference signals by the base stations may make this information potentially accessible to crowd-sourcing, enabling a BSA to be generated based on in-the-field and/or over-the-top observations.

As an example, transmission of reference signals by a base station in which the coding of the reference signals does not change or can be easily determined by UEs, and which includes an implicit or explicit identifier for the base station or an associated cell, may enable UEs or other parties to easily identify the base station or cell by receiving the reference signals and to "reverse locate" the base station or the cell antenna and/or use the reference signals to support UE based positioning without the consent or knowledge of the associated network. The information obtained from reverse location and for reference signals whose associated base stations and/or cells can be easily identified may further be used to support commercial location services for which network operators receive no direct benefit and which potentially compete with location services offered by network operators.

To address such issues related to the conventional UE-based positioning, the present disclosure describes the following techniques:
1) Obscure and introduce time-variation in mapping between positioning signals (e.g., PRS, CRS, etc.) and the corresponding physical base station (i.e., entries in the BSA);
2) Introduce time-variation of the information fields of the BSA (e.g., synchronization error);
3) Encrypt positioning signal configurations (both unicast and broadcast).

In an aspect, some or all of the time-variation may be deterministic, for example, based on pseudo-random generator keys. Also, the keys may be periodically changed, and provided with encryption only to subscribed UEs. The change period may be configurable depending on security needs, for example, every PRS occasion, every N frames/hours/days, etc. The change may also not necessarily be strictly periodic. For example, there could be a change once every 100 radio frames, but the exact frame at which the change occurs may itself vary based on another pseudo-random sequence generator, with the sequence key itself provided only to subscribed UEs. In other words, the network may adjust the mapping of reference signals to base stations (e.g., gNBs) and/or adjust transmission characteristics of the positioning signals from the base stations. These adjustments may be based on an equation or algorithm, which can be shared with authorized UEs as needed. Thus, the equation or algorithm can be encrypted and shared along with the BSA with authorized UEs, while deriving the BSA from the in-the-field or over-the-top observations would be made much more difficult. Moreover, the equation or algorithm may be updated, as deemed desirable or necessary, to help ensure BSA information remains protected. Note that as used herein, references to "periodic" changes include both strictly periodic (i.e., at fixed intervals) and this more general periodicity (i.e., repeatedly occurring, but not necessarily at fixed intervals).

The BSA may include various parameters for each cell/TRP, such as:
  bae station and/or cell/TRP identifier or identity (ID);
  configuration information for one or more reference signals (e.g., PRS or CRS) transmitted by the base station or cell/TRP (e.g., carrier frequency, bandwidth, frequency hopping scheme, encoding, muting pattern, timing and occurrence of transmissions, direction of transmission(s), horizontal and/or vertical beam width(s));
  base station location (e.g., X, Y (and Z) coordinates);
  antenna panel orientation;
  antenna element and beam patterns;
  group-delay between digital domain and RF/antenna;
  synchronization error between different base stations (e.g., between neighboring base stations).

The above list is not necessarily exhaustive. Also, all of the parameters may be per base station, per sector (e.g., for three-sector base stations), per panel, or per antenna.

In an aspect, to obscure mapping between positioning signals and the gNBs (or more broadly base stations), some or all gNBs may change their respective cell-IDs and/or base station IDs periodically. When a gNB includes multiple sectors, the cell-IDs of one or more of the sectors may change periodically. A change of one cell-ID may be independent from a change to another cell-ID.

The mapping of the cell IDs and a corresponding entry in the BSA can be made known to a subscribed UE. Conventionally, the UE reporting its cell-ID and UE location to third parties (such as mapping applications) can allow such third parties to uncover the geographical locations corresponding to each cell-ID (e.g., by reverse location of a gNB using measurements of signals transmitted by the gNB obtained at different known locations (e.g., determined independently using GNSS) by one or more UEs). However, the periodic cell-ID (or base station ID) changes can make maintaining up-to-date base station and/or cell information much more difficult for the third parties without subscribing to the service.

It is recognized that periodic changes to cell-IDs can have some impact, and the impact may be beyond just for positioning. For example, a cell-ID change can also change the scrambling of physical-layer channels. To address this issue, UEs that are already connected may be informed in advance (e.g., through encrypted messages or previously provided equations, algorithms, etc.), and thus, would not experience any interruption. This would apply regardless of whether the connected UEs are subscribed for the enhanced positioning service or not, and implies that UEs should be able to handle frequent changes in cell-IDs. (Note that this is to ensure connectivity with the cell as its cell-ID changes, which applies regardless of subscription; the distinction between the subscribed and unsubscribed UEs is that only the subscribed UEs will be able to translate the time-varying cell-ID to an entry in the BSA.) However, idle 'cold-starting' unsubscribed UEs may experience somewhat longer access time if accessing the gNB occurs shortly before the cell-ID change, because these UEs first acquire the synchronization channel (such as SSB), and the structure of this channel (e.g., the sequence used for the PSS and SSS) depends on the cell-ID, and thus the acquisition process may be disturbed by the change in cell-ID.

In an aspect, the network may notify the subscribed UEs through encrypted SIBs and/or through encrypted unicast messages, such as RRC messages, or MAC control element (CE) or DCI. In an aspect, the use of broadcast or on-demand SIBs may help subscribed but idle UEs to reduce the disruption caused to the synchronization channel acquisition process by a cell-ID change, by informing them of upcoming changes. In an aspect, if complete information required for this cannot be carried in the SIBs, idle UEs may obtain the remaining information by switching to connected mode, or through existing or newly defined short-data delivery mechanisms for idle UEs, such as paging or four-step RACH or two-step RACH procedures. Idle UEs as described here may refer to UEs in RRC-idle mode, UEs in RRC-inactive mode, or both types of UEs.

Alternatively or in addition thereto, gNBs may periodically change the PRS-IDs and/or other PRS configuration parameters (e.g., PRS encoding, frequency, timing, beam shapes, beam IDs, etc.) to obscure the mapping between positioning signals and gNBs. If there are multiple sectors for a gNB, then the changes may be applied to each sector, and the change to one sector may be independent of the change to another sector. Periodically changing the PRS-IDs and/or other PRS configuration parameters of a gNB/sector may be viewed as being similar in concept to the changing of the cell-IDs discussed above, but the impact is more limited. That is, the impact can be limited to positioning functionalities, and thus can reduce the complexity of implementation and the impact to subscribed UEs.

If the periodic configuration changes as described above are limited to configurations related to positioning signals such as PRS (as opposed to cell-ID changes, which affect other signals as well), it may still be possible for unauthorized third parties to determine gNB locations via in-the-field and/or over-the-top observations (e.g., using location measurements of gNBs obtained by a plurality of UEs at a number of different known locations). However, the accuracy will be limited to that allowed by observations of [cell-ID, UE location] reports. Additional accuracy that could be achieved by using known PRS configuration data can be denied by varying the PRS-IDs.

As indicated above, alternatively or in addition to obscuring the mapping between positioning signals and gNBs, the fields of the BSA may be varied. Some BSA fields may naturally vary with time. For example, gNB timing or synchronization with other gNBs can vary. As another example, the RF-chain group delays can also vary. Such variations can be due to clock drifts, temperature variations, and so on.

However, there are also some BSA fields that can be varied deliberately to help in obscuring gNB locations from unsubscribed UEs. For example, a timing delay may be varied, either to an entire frame transmission or only to a PRS transmission. If the changed timing delay is applied to the entire frame transmission, the connected subscribed UEs may be informed separately, for example, through encrypted unicast and/or multicast and/or broadcast messages. Alternatively or in addition thereto, the change in the timing delay may be accounted for by gNB timing advance (TA) corrections.

In another example, the mapping between the index of SSBs and/or PRSs and their corresponding beam shapes may be changed. This can deny non-subscribers any additional accuracy from beam-shape information in the BSA. As a further example, antenna panel orientations may be changed. The changes may be made to modify coverage, for example, based on peak/off-peak hours. The panels may be tilted, and the extent of the tilt may be changed, for example, using motors, or virtually by changing the beam boresight directions in elevation and/or azimuth. In an aspect, if the BSA information includes the panel orientation, this implies a change in the BSA.

The changes made may be signaled separately or jointly to the subscribing UEs by the network (e.g., by the location server and/or the serving gNB). In separate signaling, each specific change (e.g., group-delay change, beam-shape change, etc.) may be indicated separately in a BSA update message, or indicated in separate BSA update messages. In joint signaling, a set of possible configurations of all the parameters that may be changed may be pre-configured, and the BSA update message may simply indicate an index into this subset. It is readily seen that a hybrid scheme is also possible wherein the parameters are grouped and changes to all parameters within a group are indicated jointly, whereas changes for separate groups are indicated separately. It should also be noted that multiple PRSs may be configured. Also, PRS related changes (e.g., changes to beam shapes) may apply to all PRS configurations or to an indicated subset of the PRS configurations. For example, high-accuracy PRSs (e.g., wide bandwidth signals) may have more frequent configuration changes relative to low-accuracy PRSs (e.g., narrow bandwidth signals). Changes to different PRS configurations could also be indicated either separately or jointly, with the definitions of 'separate' and 'joint' as described above. In all the above descriptions, the change notifications to the UE from the network could originate at different types of network nodes, for example, a core-network or central node such as a location server, or a gNB.

Figure 4:
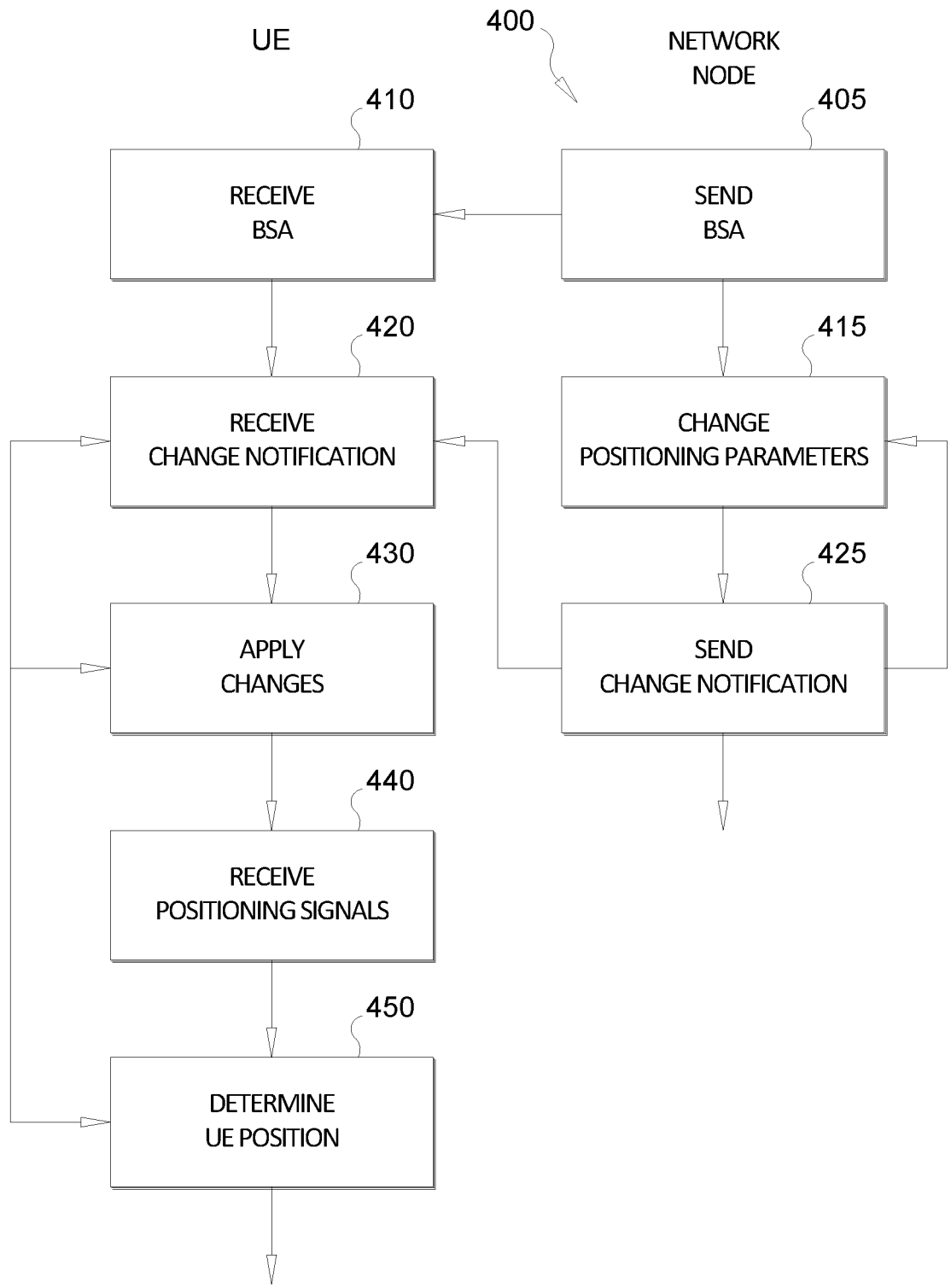
FIG. 4 illustrates an exemplary method performed by a UE and a network node to enable UE-based position determination in accordance with one or more aspects of the disclosure.

FIG. 4 illustrates an exemplary method 400 performed by a UE and a network node to enable UE-based position determination. The UE may correspond to any of the UEs described herein. At block 405, the network node (e.g., a serving gNB, a location server) may send the BSA to the UE, which may be received by the UE at block 410. In the example of FIG. 4, it is assumed that the UE is a subscribed UE, i.e., the UE is an authorized UE.

The BSA can include information for a plurality of base stations in a communication network to enable a location of the UE to be determined. As such, the BSA may include locations (e.g., X, Y (and Z) coordinates) for each of the plurality of base stations in the BSA. For protection, the BSA may be encrypted before being sent to the UE at block 405, and the UE may decrypt the BSA after receiving the encrypted BSA at block 410. It will be appreciated that the BSA does not necessarily contain information for every base station in the network. For example, the UE may receive only the information regarding base stations that are relevant to determine its position, for example, base-stations of which it is aware of the PRS configuration, or is monitoring PRS (referred to as "involved" base stations).

At block 415, the network node may change positioning signal parameters of one or more positioning signals of one or more base stations. At block 425, the network node may send a change notification, which may be received at block 420 by the UE. The change notification may reflect changes to the positioning signal parameters made at block 415. The network node may loop between blocks 415 and 425 as necessary to prevent unsubscribed UEs from gaining access.

The change notification may be encrypted by the network node before being sent to the UE, and the UE may decrypt the received change notification. In an aspect, the change notification may comprise one or more changes to positioning signal parameters of positioning signals transmitted from one or more base stations of the plurality of base stations. For example, the change notification may notify the UE regarding:

Changes to cell-IDs of one or more base stations;
Changes to PRS-IDs and/or PRS configurations (e.g., beam shapes) of one or more base stations;
Changes to timing delays of transmissions from one or more base stations, either to the entire frame or to PRS only;
Changes to mapping of SSB and/or PRS index to their corresponding beam shapes for one or more base stations; and/or
Changes to antenna panel orientations for one or more base stations.

At block 430, the UE may apply the changes to the to the positioning signal parameters of the positioning signals in accordance with the change notification. At block 440, the UE may receive a plurality of positioning signals (e.g., PRSs) from the plurality of base stations. At block 450, the UE may determine its location—the UE position—based on the received plurality of positioning signals and based on the positioning signal parameters of the plurality of positioning signals.

For example, the UE may determine its distance from each of the plurality of base stations based on the received positioning signals. In order to do so, the UE may determine, for a particular received PRS, the cell-ID and/or the PRS-ID of the received PRS. From the cell-ID and/or the PRS-ID, the UE may determine the location of the corresponding base station from the BSA, and thereby determine its distance from each base station based on the received PRS (e.g., using RTT procedures). The UE would have the correct mapping since any changes to such mapping information would have been applied at block 430.

In one aspect, some changes to the positioning signal parameters may be deterministic. For example, the cell-ID change of a gNB may be made through a pseudo-random generator at predetermined intervals. The predetermined interval for one base station may be independent of another base station. Also, the key or seed for the pseudo-random generator may be individualized for each base station.

Indeed, any of the positioning signal parameters, such as PRS-ID, PRS configuration, timing delays, SSB and/or PRS index mapping, antenna panel orientation, etc., may be changed in a deterministic manner. The information necessary for the UE to change the positioning signal parameters may be provided by the network node at block 415 and received by the UE at block 420. That is, the change notification may include information such as the change time interval (i.e., how often the change should be made, e.g., each day, every N hours, etc.). The notification may also include a change increment. For example, the cell-ID may be changed by a cell-ID increment, the PRS-ID may be changed by a PRS-ID increment, the timing delay may be changed by a timing delay increment, and so on. When the incremental change results in the value of the parameter going outside of some acceptable range (e.g., the cell-ID may be limited to a range between, e.g., 0 and 1007), the value may be "wrapped around." The changes may be performed through pseudo-random generators. In these instances, keys or seeds to the generators may also be provided. For the positioning signal parameters that are deterministically changed, the UE may proceed to block 430 from block 450.

In another aspect, however, the UE may periodically receive the change notifications (i.e., block 420 may occur periodically). When the change notifications are received, the UE may proceed from block 450 to block 420, and correspondingly apply the specified changes to the positioning signal parameters at block 430. Of course, it is contemplated that both may occur with, for example, application of changes in accordance with the received change notification taking precedence over deterministic changes.

Figure 5:
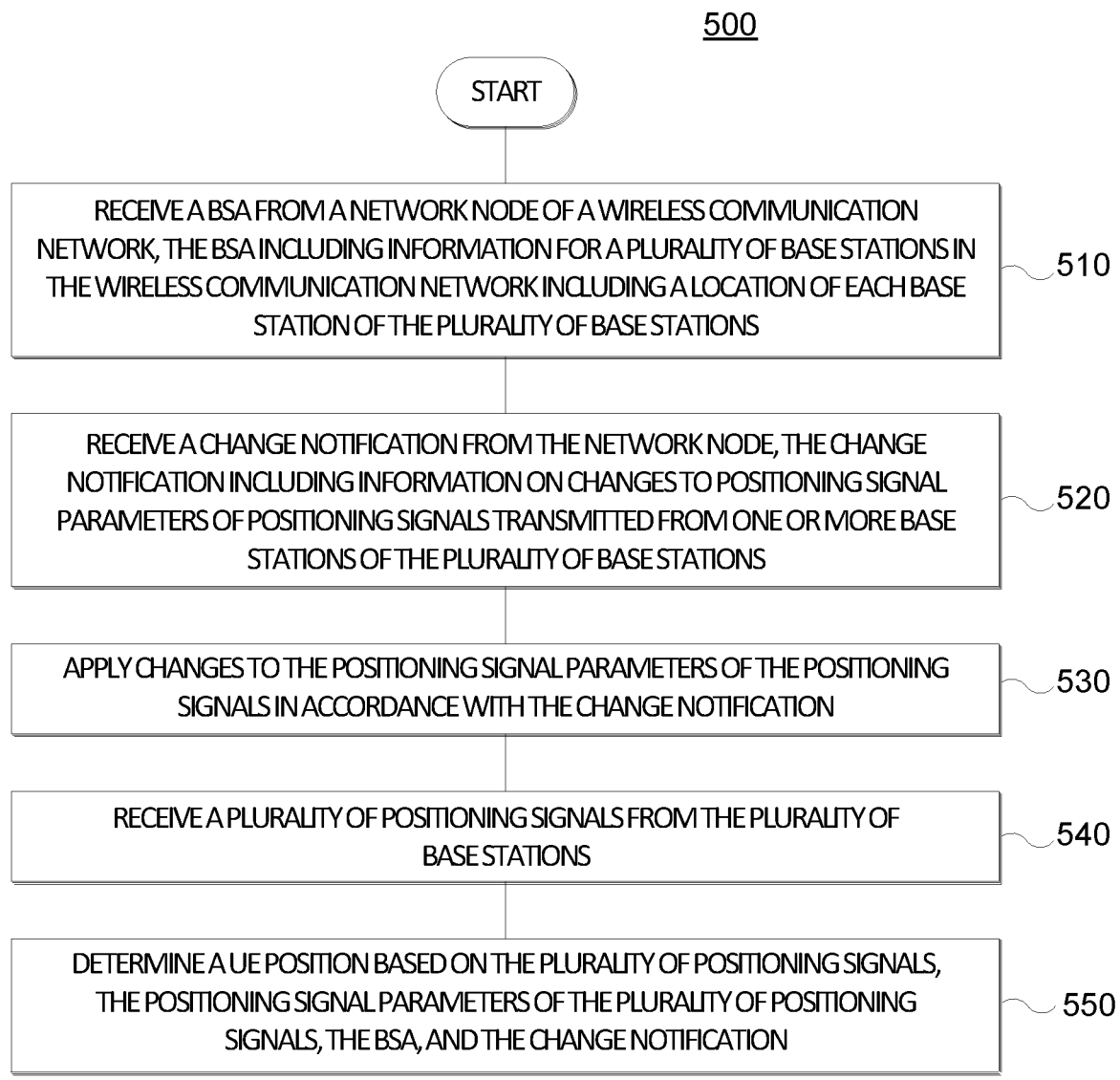
FIGS. 5 and 6 illustrate exemplary methods according to various aspects of the disclosure.

FIG. 5 illustrates an exemplary method 500 of operating a UE (e.g., any of the UEs described here), according to aspects of the disclosure.

At 510, the UE receives a BSA from a network node (e.g., a location server or a serving base station) of a wireless communication network. In an aspect, the BSA includes information for a plurality of base stations in the wireless communication network including a location of each base station of the plurality of base stations. In an aspect, operation 510 may be performed by receiver(s) 312, WWAN transceiver 310, processing system 332, memory 340, and/or positioning component 342, any or all of which may be considered means for performing this operation.

At 520, the UE receives a change notification from the network node. In an aspect, the change notification includes information on changes to positioning signal parameters of positioning signals transmitted from one or more base stations of the plurality of base stations. In an aspect, operation 520 may be performed by receiver(s) 312, WWAN transceiver 310, processing system 332, memory 340, and/or positioning component 342, any or all of which may be considered means for performing this operation.

At 530, the UE applies changes to the positioning signal parameters of the positioning signals in accordance with the change notification. In an aspect, operation 530 may be performed by receiver(s) 312, WWAN transceiver 310, processing system 332, memory 340, and/or positioning component 342, any or all of which may be considered means for performing this operation.

At 540, the UE receives a plurality of positioning signals from the plurality of base stations. In an aspect, operation 540 may be performed by receiver(s) 312, WWAN transceiver 310, processing system 332, memory 340, and/or positioning component 342, any or all of which may be considered means for performing this operation.

At 550, the UE determines a UE position based on the plurality of positioning signals, the positioning signal parameters of the plurality of positioning signals, the BSA, and the change notification. In an aspect, operation 550 may be performed by WWAN transceiver 310, processing system 332, memory 340, and/or positioning component 342, any or all of which may be considered means for performing this operation.

Figure 6:
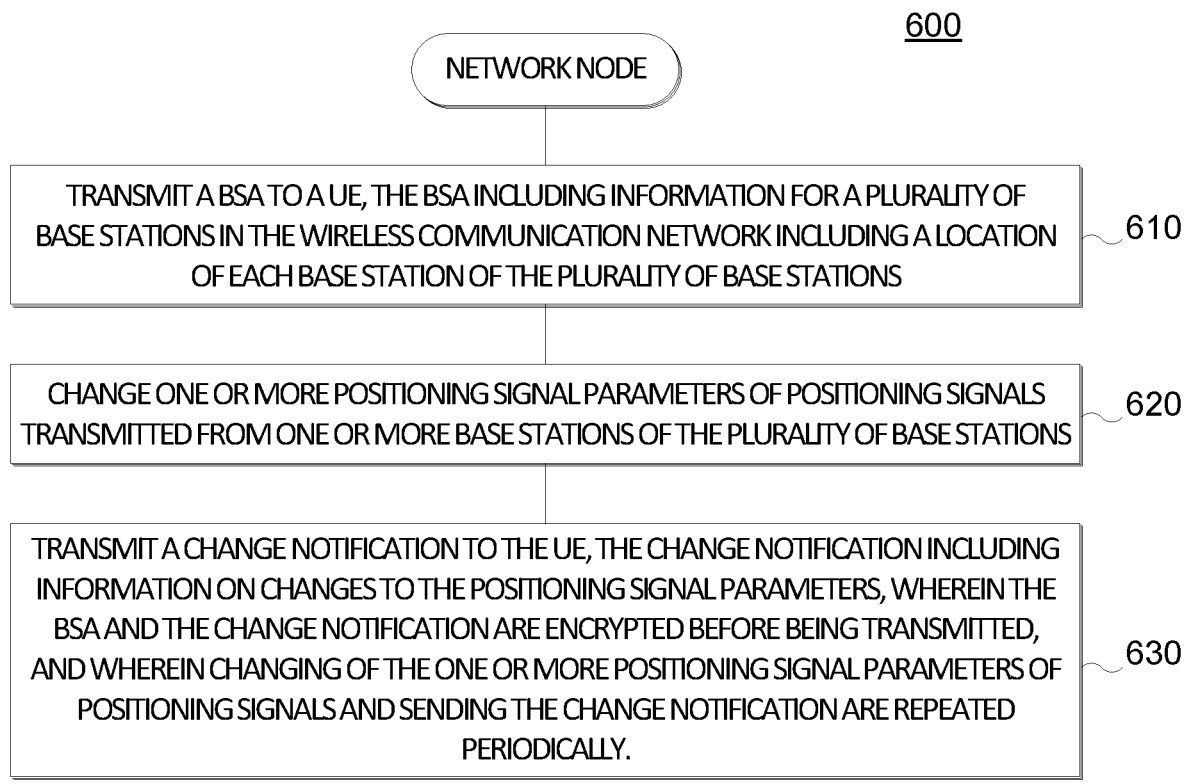

FIG. 6 illustrates an exemplary method 600 of operating a network node (e.g., a location server or serving base station) of a wireless communication network, according to aspects of the disclosure.

At 610, the network node transmits a BSA to a UE (e.g., any of the UEs described herein). In an aspect, the BSA includes information for a plurality of base stations in the wireless communication network including a location of each base station of the plurality of base stations. In an aspect, where the network node is a base station, operation 610 may be performed by transmitter(s) 354, WWAN transceiver 350, processing system 384, memory 386, and/or positioning component 388, any or all of which may be considered means for performing this operation. In an aspect, where the network node is a location server, operation 610 may be performed by network interface(s) 390, processing system 394, memory 396, and/or positioning component 398, any or all of which may be considered means for performing this operation.

At 620, the network node changes one or more positioning signal parameters of positioning signals transmitted from one or more base stations of the plurality of base stations. For example, where the network node is a location server, the network node may instruct the one or more base stations to change the one or more positioning signal parameters. In an aspect, where the network node is a base station, operation 620 may be performed by transmitter(s) 354, WWAN transceiver 350, processing system 384, memory 386, and/or positioning component 388, any or all of which may be considered means for performing this operation. In an aspect, where the network node is a location server, operation 620 may be performed by network interface(s) 390, processing system 394, memory 396, and/or positioning component 398, any or all of which may be considered means for performing this operation.

At 630, the network node transmits a change notification to the UE. In an aspect, the change notification includes information on changes to the positioning signal parameters. In an aspect, where the network node is a base station, operation 630 may be performed by transmitter(s) 354, WWAN transceiver 350, processing system 384, memory 386, and/or positioning component 388, any or all of which may be considered means for performing this operation. In an aspect, where the network node is a location server, operation 630 may be performed by network interface(s) 390, processing system 394, memory 396, and/or positioning component 398, any or all of which may be considered means for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method performed by a user equipment (UE), the method comprising:
   receiving a base station almanac (BSA) from a network node of a wireless communication network, the BSA including information for a plurality of base stations in the wireless communication network including a geographical location of each base station of the plurality of base stations;
   receiving a change notification from the network node, the change notification including information on changes to positioning signal parameters of positioning signals transmitted from one or more base stations of the plurality of base stations;
   applying changes to the positioning signal parameters of the positioning signals transmitted from the one or more base stations in accordance with the change notification;
   receiving a plurality of positioning signals from the plurality of base stations, the plurality of positioning signals including the positioning signals transmitted from the one or more base stations of the plurality of base stations; and
   determining a position of the UE based on the plurality of positioning signals, the positioning signal parameters of the positioning signals, and the BSA.

2. The method of claim 1, wherein the change notification comprises information on changes to cell-IDs corresponding to the one or more base stations to change a mapping of the cell-IDs to the one or more base stations in the BSA.

3. The method of claim 1, wherein the change notification comprises information on changes to positioning reference signal (PRS) IDs corresponding to the one or more base stations to change a mapping of the PRS-IDs to locations of the one or more base stations in the BSA.

4. The method of claim 1, wherein the change notification comprises information on changes to PRS configurations corresponding to the one or more base stations to change a mapping of the PRS configurations to the one or more base stations in the BSA.

5. The method of claim 4, wherein the changes to the PRS configurations comprise changes to beam shapes defined by the PRS configurations.

6. The method of claim 1, wherein the change notification comprises information on changes to a mapping of synchronization signal block (SSB) indexes to corresponding beam shapes for the one or more base stations.

7. The method of claim 1, wherein the change notification comprises information on changes to timing delays of the positioning signals transmitted by the one or more base stations.

8. The method of claim 1, wherein the change notification comprises information on changes to antenna panel orientations of the one or more base stations.

9. The method of claim 1, wherein applying the changes to the positioning signal parameters of the positioning signals comprises changing one or more positioning signal parameters of the one or more base stations deterministically.

10. The method of claim 9, wherein the change notification comprises information on the one or more positioning signal parameters of the one or more base stations that are to be determined deterministically.

11. The method of claim 1, wherein the BSA and/or the change notification received from the network node are encrypted, the method further comprising:
   decrypting the BSA and/or the change notification.

12. The method of claim 1, wherein the changes to the positioning signal parameters are applied at one or more predefined times.

13. A method performed by a network node of a wireless communication network, the method comprising:
   transmitting a base station almanac (BSA) to a user equipment (UE), the BSA including information for a plurality of base stations in the wireless communication network including a geographical location of each base station of the plurality of base stations;
   changing positioning signal parameters of positioning signals transmitted from one or more base stations of the plurality of base stations; and
   transmitting a change notification to the UE, the change notification including information on changes to the positioning signal parameters.

14. The method of claim 13, wherein the change notification comprises information on changes to cell-IDs corresponding to the one or more base stations to change a mapping of the cell-IDs to the one or more base stations in the BSA.

15. The method of claim 13, wherein the change notification comprises information on changes to positioning reference signal (PRS) IDs corresponding to the one or more base stations to change a mapping of the PRS-IDs to locations of the one or more base stations in the BSA.

16. The method of claim 13, wherein the change notification comprises information on changes to PRS configurations corresponding to the one or more base stations to change a mapping of the PRS configurations to the one or more base stations in the BSA.

17. The method of claim 16, wherein the changes to the PRS configurations comprise changes to beam shapes defined by the PRS configurations.

18. The method of claim 13, wherein the change notification comprises information on changes to a mapping of synchronization signal block (SSB) indexes to corresponding beam shapes for the one or more base stations.

19. The method of claim 13, wherein the change notification comprises information on changes to timing delays of the positioning signals transmitted by the one or more base stations.

20. The method of claim 13, wherein the change notification comprises information on changes to antenna panel orientations of the one or more base stations.

21. The method of claim 13, wherein changing the positioning signal parameters of the positioning signals comprises changing one or more positioning signal parameters of the one or more base stations deterministically.

22. The method of claim 21, wherein the change notification comprises information on the one or more positioning signal parameters of the one or more base stations that are to be determined deterministically.

23. The method of claim 13, wherein the BSA and the change notification are encrypted before being transmitted.

24. A user equipment (UE), comprising:
   a memory;
   at least one transceiver; and
   at least one processor communicatively coupled to the memory and the at least one transceiver, the at least one processor configured to:
      receive, via the at least one transceiver, a base station almanac (BSA) from a network node of a wireless communication network, the BSA including information for a plurality of base stations in the wireless communication network including a geographical location of each base station of the plurality of base stations;
receive, via the at least one transceiver, a change notification from the network node, the change notification including information on changes to positioning signal parameters of positioning signals transmitted from one or more base stations of the plurality of base stations;
apply changes to the positioning signal parameters of the positioning signals transmitted from the one or more base stations in accordance with the change notification;
receive, via the at least one transceiver, a plurality of positioning signals from the plurality of base stations, the plurality of positioning signals including the positioning signals transmitted from the one or more base stations of the plurality of base stations; and
determine a position of the UE based on the plurality of positioning signals, the positioning signal parameters of the positioning signals, and the BSA.

25. The UE of claim 24, wherein the change notification comprises information on changes to cell-IDs corresponding to the one or more base stations to change a mapping of the cell-IDs to the one or more base stations in the BSA.

26. The UE of claim 24, wherein the change notification comprises information on changes to positioning reference signal (PRS) IDs corresponding to the one or more base stations to change a mapping of the PRS-IDs to locations of the one or more base stations in the BSA.

27. The UE of claim 24, wherein the change notification comprises information on changes to PRS configurations corresponding to the one or more base stations to change a mapping of the PRS configurations to the one or more base stations in the BSA.

28. The UE of claim 27, wherein the changes to the PRS configurations comprise changes to beam shapes defined by the PRS configurations.

29. The UE of claim 24, wherein the change notification comprises information on changes to a mapping of synchronization signal block (SSB) indexes to corresponding beam shapes for the one or more base stations.

30. The UE of claim 24, wherein the change notification comprises information on changes to timing delays of the positioning signals transmitted by the one or more base stations.

31. The UE of claim 24, wherein the change notification comprises information on changes to antenna panel orientations of the one or more base stations.

32. The UE of claim 24, wherein the at least one processor being configured to apply the changes to the positioning signal parameters of the positioning signals comprises the at least one processor being configured to change one or more positioning signal parameters of the one or more base stations deterministically.

33. The UE of claim 32, wherein the change notification comprises information on the one or more positioning signal parameters of the one or more base stations that are to be determined deterministically.

34. The UE of claim 24, wherein:
the BSA and/or the change notification received from the network node are encrypted, and
the at least one processor is further configured to decrypt the BSA and/or the change notification.

35. The UE of claim 24, wherein the changes to the positioning signal parameters are applied at one or more predefined times.

36. A network node of a wireless communication network, comprising:
a memory;
a communication device; and
at least one processor communicatively coupled to the memory and the communication device, the at least one processor configured to:
cause the communication device to transmit a base station almanac (BSA) to a user equipment (UE), the BSA including information for a plurality of base stations in the wireless communication network including a geographical location of each base station of the plurality of base stations;
change positioning signal parameters of positioning signals transmitted from one or more base stations of the plurality of base stations; and
cause the communication device to transmit a change notification to the UE, the change notification including information on changes to the positioning signal parameters.

37. The network node of claim 36, wherein the change notification comprises information on changes to cell-IDs corresponding to the one or more base stations to change a mapping of the cell-IDs to the one or more base stations in the BSA.

38. The network node of claim 36, wherein the change notification comprises information on changes to positioning reference signal (PRS) IDs corresponding to the one or more base stations to change a mapping of the PRS-IDs to locations of the one or more base stations in the BSA.

39. The network node of claim 36, wherein the change notification comprises information on changes to PRS configurations corresponding to the one or more base stations to change a mapping of the PRS configurations to the one or more base stations in the BSA.

40. The network node of claim 39, wherein the changes to the PRS configurations comprise changes to beam shapes defined by the PRS configurations.

41. The network node of claim 36, wherein the change notification comprises information on changes to a mapping of synchronization signal block (SSB) indexes to corresponding beam shapes for the one or more base stations.

42. The network node of claim 36, wherein the change notification comprises information on changes to timing delays of the positioning signals transmitted by the one or more base stations.

43. The network node of claim 36, wherein the change notification comprises information on changes to antenna panel orientations of the one or more base stations.

44. The network node of claim 36, wherein the at least one processor being configured to change the positioning signal parameters of the positioning signals comprises the at least one processor being configured to change one or more positioning signal parameters of the one or more base stations deterministically.

45. The network node of claim 44, wherein the change notification comprises information on the one or more positioning signal parameters of the one or more base stations that are to be determined deterministically.

46. The network node of claim 36, wherein the BSA and the change notification are encrypted before being transmitted.

47. The network node of claim 36, wherein the network node is a serving base station, and wherein the communication device comprises at least one transceiver.

48. The network node of claim 36, wherein the network node is a location server, and wherein the communication device comprises at least one network interface.

49. A user equipment (UE), comprising:
- means for receiving a base station almanac (BSA) from a network node of a wireless communication network, the BSA including information for a plurality of base stations in the wireless communication network including a geographical location of each base station of the plurality of base stations;
- means for receiving a change notification from the network node, the change notification including information on changes to positioning signal parameters of positioning signals transmitted from one or more base stations of the plurality of base stations;
- means for applying changes to the positioning signal parameters of the positioning signals transmitted from the one or more base stations in accordance with the change notification;
- means for receiving a plurality of positioning signals from the plurality of base stations, the plurality of positioning signals including the positioning signals transmitted from the one or more base stations of the plurality of base stations; and
- means for determining a position of the UE based on the plurality of positioning signals, the positioning signal parameters of the positioning signals, and the BSA.

50. A network node of a wireless communication network, comprising:
- means for transmitting a base station almanac (BSA) to a user equipment (UE), the BSA including information for a plurality of base stations in the wireless communication network including a geographical location of each base station of the plurality of base stations;
- means for changing positioning signal parameters of positioning signals transmitted from one or more base stations of the plurality of base stations; and
- means for transmitting a change notification to the UE, the change notification including information on changes to the positioning signal parameters.

51. A non-transitory computer-readable medium storing computer-executable instructions, the computer-executable instructions comprising:
- at least one instruction instructing a user equipment (UE) to receive a base station almanac (BSA) from a network node of a wireless communication network, the BSA including information for a plurality of base stations in the wireless communication network including a geographical location of each base station of the plurality of base stations;
- at least one instruction instructing the UE to receive a change notification from the network node, the change notification including information on changes to positioning signal parameters of positioning signals transmitted from one or more base stations of the plurality of base stations;
- at least one instruction instructing the UE to apply changes to the positioning signal parameters of the positioning signals transmitted from the one or more base stations in accordance with the change notification;
- at least one instruction instructing the UE to receive a plurality of positioning signals from the plurality of base stations, the plurality of positioning signals including the positioning signals transmitted from the one or more base stations of the plurality of base stations; and
- at least one instruction instructing the UE to determine a position of the UE based on the plurality of positioning signals, the positioning signal parameters of the positioning signals, and the BSA.

52. A non-transitory computer-readable medium storing computer-executable instructions, the computer-executable instructions comprising:
- at least one instruction instructing a network node to transmit a base station almanac (BSA) to a user equipment (UE), the BSA including information for a plurality of base stations in the wireless communication network including a geographical location of each base station of the plurality of base stations;
- at least one instruction instructing the network node to change positioning signal parameters of positioning signals transmitted from one or more base stations of the plurality of base stations; and
- at least one instruction instructing the network node to transmit a change notification to the UE, the change notification including information on changes to the positioning signal parameters.

* * * * *